(12) United States Patent
Ozawa et al.

(10) Patent No.: US 7,271,866 B2
(45) Date of Patent: Sep. 18, 2007

(54) LIQUID CRYSTAL DISPLAY AND ELECTRONIC DEVICE

(75) Inventors: Kinya Ozawa, Suwa (JP); Nobutaka Urano, Chino (JP); Tsuyoshi Maeda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/352,199

(22) Filed: Jan. 28, 2003

(65) Prior Publication Data

US 2003/0160928 A1  Aug. 28, 2003

(30) Foreign Application Priority Data

Jan. 29, 2002  (JP)  ............................ 2002-019876
Dec. 20, 2002  (JP)  ............................ 2002-369975

(51) Int. Cl.
G02F 1/1335  (2006.01)
(52) U.S. Cl. ...................... 349/114; 349/106
(58) Field of Classification Search ................ 349/114, 349/113, 138, 106
See application file for complete search history.

(56) References Cited

U.S. PATENT DOCUMENTS

| | | | |
|---|---|---|---|
| 6,281,952 B1 | 8/2001 | Okamoto et al. | |
| 6,452,654 B2 * | 9/2002 | Kubo et al. | 349/114 |
| 6,614,496 B1 * | 9/2003 | Song et al. | 349/114 |
| 6,624,860 B1 * | 9/2003 | Narutaki et al. | 349/106 |
| 6,680,765 B1 * | 1/2004 | Maeda et al. | 349/117 |
| 6,741,308 B2 * | 5/2004 | Ha | 349/114 |
| 6,788,375 B2 | 9/2004 | Ogishima et al. | |
| 6,967,702 B2 | 11/2005 | Ishii et al. | |
| 2002/0036730 A1 | 3/2002 | Baek et al. | |
| 2002/0080320 A1 | 6/2002 | Suzuki et al. | |
| 2002/0149728 A1 | 10/2002 | Ogishima et al. | |
| 2003/0160928 A1 | 8/2003 | Ozawa et al. | |
| 2004/0085499 A1 | 5/2004 | Baek | |
| 2005/0001947 A1 | 1/2005 | Ogishima et al. | |
| 2005/0018120 A1 | 1/2005 | Ozawa et al. | |

FOREIGN PATENT DOCUMENTS

| | | |
|---|---|---|
| JP | A 06-112486 | 4/1994 |
| JP | A-07-311383 | 11/1995 |
| JP | A 11-101992 | 4/1999 |
| JP | A 11-149096 | 6/1999 |
| JP | A-11-242226 | 9/1999 |
| JP | 2000-19563 | 1/2000 |
| JP | A-2000-137243 | 5/2000 |

(Continued)

Primary Examiner—Toan Ton
(74) Attorney, Agent, or Firm—Oliff & Berridge, PLC

(57) ABSTRACT

To provide a liquid crystal display capable of obtaining light and high-contrast display having a wide viewing angle in a transflective liquid crystal display. A liquid crystal display of the present invention employs a vertical alignment mode using a liquid crystal layer 50 that is vertically aligned in the initial alignment state, wherein a transparent display area T is disposed to surround the periphery of a reflective display area R in one dot, and an insulating film 21 is provided in the area that corresponds to the reflective display area R in the center of the dot, the insulating film 21 making the thickness of the liquid crystal layer 50 in the reflective display area R smaller than the thickness of the liquid crystal layer 50 in the transparent display area T.

21 Claims, 14 Drawing Sheets

FOREIGN PATENT DOCUMENTS

| | | |
|---|---|---|
| JP | A-2000-267081 | 9/2000 |
| JP | A-2000-305099 | 11/2000 |
| JP | A 2000-314886 | 11/2000 |
| JP | A-2002-287158 | 10/2002 |
| JP | A-2003-167253 | 6/2003 |
| JP | A-2003-295177 | 10/2003 |
| JP | A-2004-69767 | 3/2004 |
| KR | 2001-102804 | 11/2001 |
| KR | 2002-5079 | 10/2002 |

* cited by examiner

LIQUID CRYSTAL DISPLAY AND ELECTRONIC DEVICE

BACKGROUND OF THE INVENTION

1. Field of Invention

The present invention relates to a liquid crystal display and an electronic device. More specifically, the invention relates to a technique of obtaining a high-contrast display having a wide viewing angle in a transflective liquid crystal display that performs display in both a reflective mode and a transparent mode.

2. Description of Related Art

Since reflective liquid crystal displays have no light sources, such as a backlight, they consume low power, and thus can be used for various portable electronic devices. However, the reflective liquid crystal displays perform display using outside light, such as sunlight and illumination light. Thus, these displays are subject to low visibility in a dark place. Therefore, the related art includes liquid crystal displays capable of making display visible using outside light in a light place, as in general reflective liquid crystal displays, and using an inside light source, such as a backlight, in a dark place. In other words, such liquid crystal displays employ a reflective and transparent display system, thereby allowing clear display even in low light while reducing power consumption by switching the display system between the reflective mode and the transparent mode depending on the surrounding brightness. Hereinafter, in this specification, liquid crystal displays of this type are referred to as "transflective liquid crystal displays."

Such related art transflective liquid crystal displays include a liquid crystal display having a structure in which a liquid crystal layer is sandwiched between an upper substrate and a lower substrate. A reflective film having a light-transmitting window in a metallic film made of aluminum or the like is provided on the inner surface of the lower substrate, and this reflective film functions as a transflective film. In this case, in a reflective mode, outside light that has entered from the upper substrate passes through the liquid crystal layer, is then reflected by the reflective film, again passes through the liquid crystal layer, and outgoes from the upper substrate, thus contributing to display. On the other hand, in a transparent mode, light from the backlight, which has entered from the lower substrate, passes through the liquid crystal layer from the window of the reflective film, and then emerges from the upper substrate to the exterior, thereby contributing to display. Accordingly, in the reflective-film formed area, the area which has the window serves as a transparent display area and the other area serves as a reflective display area.

Liquid crystal alignment modes include a twisted nematic (hereinafter "TN") mode in which liquid crystal molecules exhibit a twisted alignment substantially parallel to the substrate surface and vertical to the substrate; and a vertical alignment mode in which liquid crystal molecules exhibit vertical alignment, under a no voltage applied state. Although, in the related art, the TN mode can be viewed as reliable, the related art also includes liquid crystal displays that in the vertical alignment mode can provide some excellent characteristics.

For example, in the vertical alignment mode, since the state in which the liquid crystal molecules are aligned vertically to the substrate surface (there is no optical retardation as viewed from the normal) is used as black display, the black display is superior in quality, thus providing high contrast. In vertical-alignment LCDs which are superior in front contrast, the range of viewing angle in which a fixed contrast can be obtained is wider than that of the horizontal-alignment-mode TN liquid crystal. Furthermore, employing an alignment dividing (multidomain) technique of dividing the alignment orientation of a liquid crystal in pixels provides a remarkably wide viewing angle.

In the transflective liquid crystal display with the aforesaid structure, the retardation of the liquid crystal in the reflective display area is expressed by: $2 \times \Delta n \cdot d$, because the incident light passes through the liquid crystal layer two times and then reaches the observer, where the thickness of the liquid crystal layer is d, the refractive index anisotropy of the liquid crystal is: $\Delta n$, and the retardation of the liquid crystal which is expressed as their integrated value is: $\Delta n \cdot d$. On the other hand, the retardation of the liquid crystal in the transparent display area is expressed by: $1 \times \Delta n \cdot d$, because the light from the backlight passes through the liquid crystal layer only once.

As described above, when the alignment of the liquid crystal molecules of the liquid crystal layer is controlled, even with the structure having different retardation values in the reflective display area and in the transparent display area, an electric field has been applied to the liquid crystal at the same driving voltage in both display modes. In such a case, when the liquid crystal with different display modes, in other words, the liquid crystal with different retardations between the transparent display area and the reflective display area is aligned at the same driving voltage, it poses a problem of obtaining no high-contrast display. In order to address or solve the problem, a liquid crystal display is disclosed in Japanese Unexamined Patent Application Publication No. 11-242226 that has a structure having different thicknesses of the liquid crystal layer in the transparent display area and in the reflective display area.

SUMMARY OF THE INVENTION

As described above, using the vertical alignment mode can also be used to achieve high contrast. Therefore, a liquid crystal display with a combination of the transflective liquid crystal display and the vertical alignment mode can be beneficial. However, problems exist with such a structure, including a problem of decreased contrast due to the difference in retardation in the reflective and transparent display modes, problems of alignment control and alignment division in the vertical alignment mode, and so on, thus preventing such a display from becoming realized.

The present invention addresses or solves the above and/or other problems, and provides a liquid crystal display capable of obtaining light and high-contrast display having a wide viewing angle in a transflective liquid crystal display.

In order to address or achieve the above, a liquid crystal display according to the present invention includes a liquid crystal layer sandwiched between a pair of substrates, and separately having a transparent display area for transparent display and a reflective display area for reflective display in one dot area. The liquid crystal layer exhibits vertical alignment in the initial alignment state. An insulating film is provided between at least one of the pair of substrates and the liquid crystal layer and in at least the reflective display area, the insulating film making the thickness of the liquid crystal layer in the reflective display area and in the transparent display area different owing to its film thickness.

The liquid crystal display of the present invention is a combination of a transflective liquid crystal display and a liquid crystal in a vertical alignment mode. A transflective liquid crystal display can be provided with a structure in which, in order to address or solve the problem of reduction in contrast due to the difference of retardation between the reflective and the transparent display modes, the thickness of the liquid crystal layer is varied in the reflective display area and in the transparent display area by forming an insulating film with a fixed thickness in the reflective display area on the lower substrate so as to project toward the liquid crystal layer. The applicants have studied this type of liquid crystal display. With such a structure, the thickness of the liquid crystal layer in the reflective display area can be made to be smaller than that of the liquid crystal layer in the transparent display area owing to the presence of the insulating film. Therefore, the retardation in the reflective display area and the retardation in the transparent display area can be sufficiently close to or substantially equal to each other, thereby allowing an increase in contrast.

The inventors have found that the alignment orientation of the liquid crystal in a vertical alignment mode during the application of an electric field can be controlled by combining a liquid crystal layer in a vertical alignment mode to the liquid crystal display having the above insulating film. More specifically, a negative liquid crystal is generally used when the vertical alignment mode is employed. However, the direction in which the liquid crystal molecules fall cannot be controlled without any considerations (unless a pre-tilt is given) because the liquid crystal molecules are brought down from a state of standing vertically to the substrate surface in the initial alignment state, thus generating disturbance of alignment (disclination) to cause imperfect display such as light dropout, resulting in a decrease in display quality. Therefore, when the vertical alignment mode is employed, an important factor is to control the alignment orientation of the liquid crystal molecules in applying an electric field. In the liquid crystal display having the aforesaid insulating film, the insulating film projects toward the liquid crystal layer, which serves as a projection. Thus, a pre-tilt that corresponds to the shape of the projection can be given with the liquid crystal molecules vertically aligned in the initial state. Due to this action, the alignment orientation when an electric field is applied to the liquid crystal molecules can be controlled. Consequently, high-contrast display can be achieved without imperfect display, such as light drop.

With the structure of the present invention, the transflective liquid crystal display in a vertical alignment mode has an insulating film. Accordingly, the problem of reduction in contrast due to the difference of retardation between the reflective and the transparent display modes can be addressed or solved, which is a fundamental problem of the transflective liquid crystal display, and imperfect display, because of the fact that the alignment orientation of the liquid crystal molecules in the vertical alignment mode cannot be controlled, can be reduced. Consequently, both the advantage of the vertical alignment mode and the advantage of the transflective type can fully be taken to realize a liquid crystal display of high display quality.

The arrangement of the transparent display area and the reflective display area in one dot area can be set arbitrarily. However, it is preferable to arrange the transparent display area so as to surround the periphery of the reflective display area and to arrange the insulating film in the area that corresponds to the reflective display area in the center of the dot.

From such a viewpoint, another liquid crystal display of the present invention includes a liquid crystal layer sandwiched between a pair of substrates, and separately having a transparent display area for transparent display and a reflective display area for reflective display in one dot area. An insulating film is provided between at least one of the pair of substrates and the liquid crystal layer and in at least the reflective display area, the insulating film making the thickness of the liquid crystal layer in the reflective display area and in the transparent display area different owing to its film thickness. The thickness of the liquid crystal layer in the center of the dot area is set to be smaller than in the periphery in the one dot area.

With such a structure, if a rectangular reflective display area is provided in the center of one dot area and a rectangular insulating film is disposed therein, around which a transparent display area is formed, the alignment orientations of the liquid crystal molecules are specified to four orientations that are perpendicular to each side of the rectangle with the insulating film in the center of the dot as the center. As a result, four areas that each have a different alignment orientation are formed in one dot area to realize an alignment dividing structure, thus achieving a wide viewing angle.

Alternatively, contrarily to the aforesaid structure, it is also possible to have a structure in which an insulating film is provided between at least one of the pair of substrates and the liquid crystal layer and in at least the reflective display area, the insulating film making the thickness of the liquid crystal layer in the reflective display area and in the transparent display area different owing to its film thickness. The thickness of the liquid crystal layer in the periphery of the one dot area is set to be smaller than in the center. More specifically, the reflective display area is provided so as to surround the periphery of the transparent display area in the one dot. The insulating film is disposed in the area corresponding to the reflective display area in the periphery of the dot.

With such a structure, if a rectangular reflective display area is provided in the center of one dot area, a rectangular-frame-shaped insulating film is disposed on the outside thereof, and a reflective display area is formed in the periphery thereof, the alignment orientations of the liquid crystal molecules are specified to four orientations that are perpendicular to each side of the rectangular frame from the insulating film in the periphery of the dot area toward the center. As a result, four areas that each have a different alignment orientation are formed in one dot area, as in the aforesaid structure, to realize an alignment dividing structure, thus achieving a wide viewing angle.

Preferably, the insulating film includes an inclined area in the vicinity of the boundary between the reflective display area and the transparent display area, the inclined area having an inclined plane so that its thickness continuously varies.

The end of the insulating film, which corresponds to the boundary between the reflective display area and the transparent display area, may have a step-like difference in thickness. However, in such a case, the thickness of the liquid crystal layer sharply changes because of the aforesaid step in the vicinity of the boundary between the reflective display area and the transparent display area, thus causing alignment disturbance of the liquid crystal to exert a bad influence upon display. On the other hand, when the insulating film has an inclined plane so as to continuously vary the thickness thereof, the alignment of the liquid crystal also varies continuously depending on the position of the inclined plane of the insulating film, thus causing no large or substantial disturbance of alignment to prevent or reduce imperfect display. When the insulating film is rectangular, as described above, the inclined plane is also inclined in four directions perpendicularly crossing each other. Therefore, the presence of the inclined plane allows smooth formation of the alignment dividing structure.

It is also possible to provide an electrode to drive the liquid crystal layer to the substrate having the insulating film and to provide a no electrode formed area where the electrode is absent in at least part of the inclined plane of the insulating film.

With the structure of the present invention, as described above, merely providing an insulating film that is a projection projecting toward the liquid crystal layer allows control of alignment orientation. However, when no electrode formed area is provided to at least part of the inclined plane of the insulating film, an electric field (potential lines) generating between the electrodes on both the substrates is distorted in the vicinity of the no electrode formed area. The action of the distorted electric field allows smooth or substantially smooth control of the alignment orientation of the liquid crystal molecules.

Assuming that the center of one dot is a rectangular reflective display area, the periphery is a transparent display area and a rectangular-frame-shaped no electrode formed area is provided in the inclined area of the insulating film, which corresponds to the boundary between the reflective display area and the transparent display area, the electrode of the reflective display area and the electrode of the transparent display area are completely separated. Therefore, it becomes difficult to apply the same driving voltage to both of them at the same time. Accordingly, it is preferable to provide a structure in which the electrode in the reflective display area and the electrode in the transparent display area, which are provided on both sides of the no electrode formed area, are electrically connected through a connecting section formed of the same layer as the electrodes. Alternatively, it is also preferable to provide a structure in which the electrode in the reflective display area and the electrode in the transparent display area are electrically connected through a connecting section formed of a different layer from the electrodes. With such a structure, the same driving voltage can easily be applied simultaneously to the electrode in the reflective display area and the electrode in the transparent display area.

When one of the substrates is an element substrate having a pixel electrode and a switching element and the other substrate is an opposed substrate having a common electrode and the insulating film, it is preferable to dispose a contact hole to electrically connect the pixel electrode and the switching element on the one substrate in the position not overlapping the inclined area.

Since the contact hole that electrically connects the pixel electrode and the switching element is formed on the upper layer of one substrate, the pixel electrode is generally recessed at the portion of the contact hole. Therefore, with the aforesaid structure, the electric field that has been distorted in the vicinity of the no electrode formed area is further distorted because of the recess of the pixel electrode, thereby facilitating control of the alignment of the liquid crystal molecules.

Furthermore, when an electrode to drive the liquid crystal layer and an insulating film are provided on one of the pair of substrates, and an electrode to drive the liquid crystal layer is provided on the other substrate, it is preferable that the electrode on the other substrate include a window on the outside of the inclined area of the insulating film.

With the structure of the present invention, as described above, merely providing the insulating film that is a projection projecting toward the liquid crystal layer allows control of alignment orientation. However, when the electrode on the other substrate, which is opposed to the insulating film, has a window on the outside of the inclined area of the insulating film, an electric field generating between the electrodes on both the substrates tilts because there are no electrodes at the window. The action of the tilted electric field allows smoother control of the alignment orientation of the liquid crystal molecules.

When the insulating film has an inclined plane, it is preferable that the inclination angle of the inclined plane of the insulating film relative to the substrate surface be in the range of 5° to 50°. The inclined plane may be either planar or curved. Here, "the inclination angle of the inclined plane" means an angle θ formed by the tangential line S of an inclined plane in the position where the layer thickness in the inclined area is h/2, and a substrate surface (planar plane), where the thickness of the flat part of the insulating film is h.

When the inclination angle is less than 5°, it forms a gentle inclined plane. Therefore, the inclined area increases in size to have too large an area where the retardation becomes fragmentary, thus increasing optical loss. On the other hand, when the inclination angle exceeds 50°, it forms a steeply inclined plane. Therefore, the liquid crystal molecules are aligned vertically to the inclined plane when non-selected voltage is applied, thereby generating disclination between the liquid crystal molecules on the inclined plane and those on the planar plane. Consequently, black floating (a leak of light) occurs to decrease in contrast. Therefore, it is desirable that the inclination angle be in the range of 5° to 50°.

The outline of the insulating film in one dot area is not particularly limited, and the invention can include various shapes. However, when it is an equilateral polygon or a circle, the liquid crystal molecules are uniformly divided in each direction in one dot area. As a result, a viewing angle at which high contrast is obtained can be isotropically widened.

Furthermore, providing a circularly-polarized-light radiating device to radiate circularly polarized light to the one substrate or the other substrate allows preferable reflective display and transparent display.

An electronic device of the present invention includes the liquid crystal display according to the present invention.

With such a structure, electronic devices can be provided which have a light and high-contrast liquid crystal display having a wide viewing angle irrespective of use environment.

DETAILED DESCRIPTION OF PREFERRED EMBODIMENTS

Figure 1:
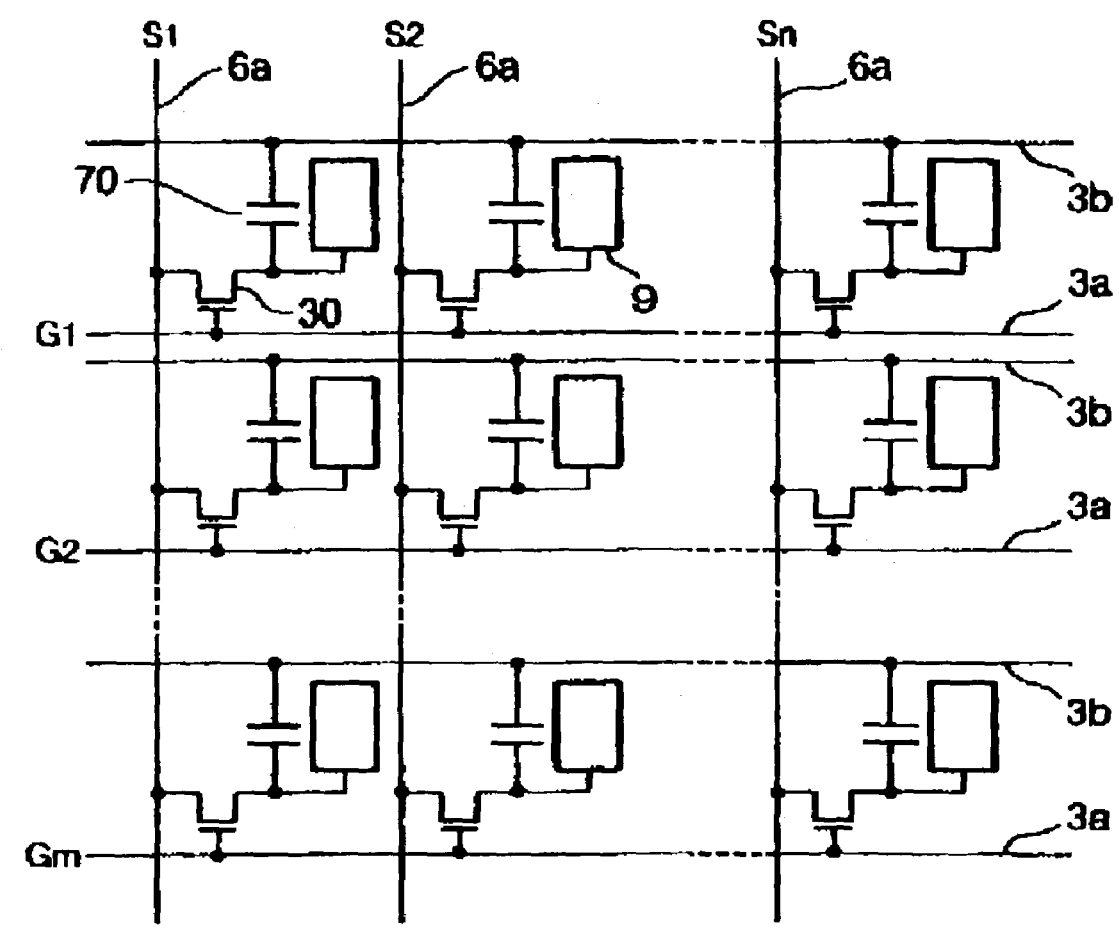
FIG. 1 is a schematic circuit diagram of a plurality of dots arranged in the form of matrix which constitute an image display area of a liquid crystal display according to a first exemplary embodiment of the present invention.
Figure 2:
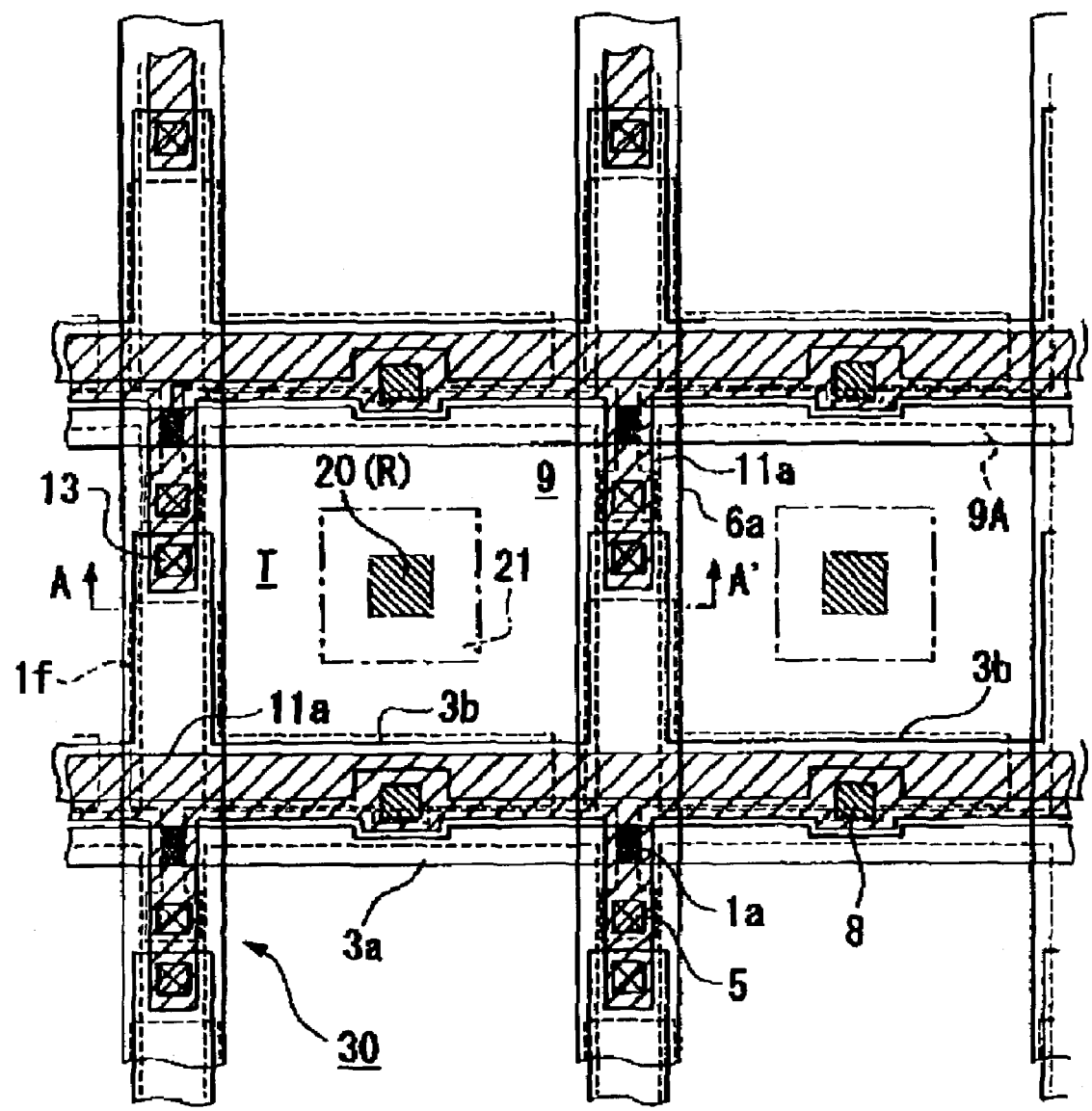
FIG. 2 is a plan view showing the structure of an adjacent plurality of dots on a TFT array substrate which constitutes the liquid crystal display of the same.
Figure 3:
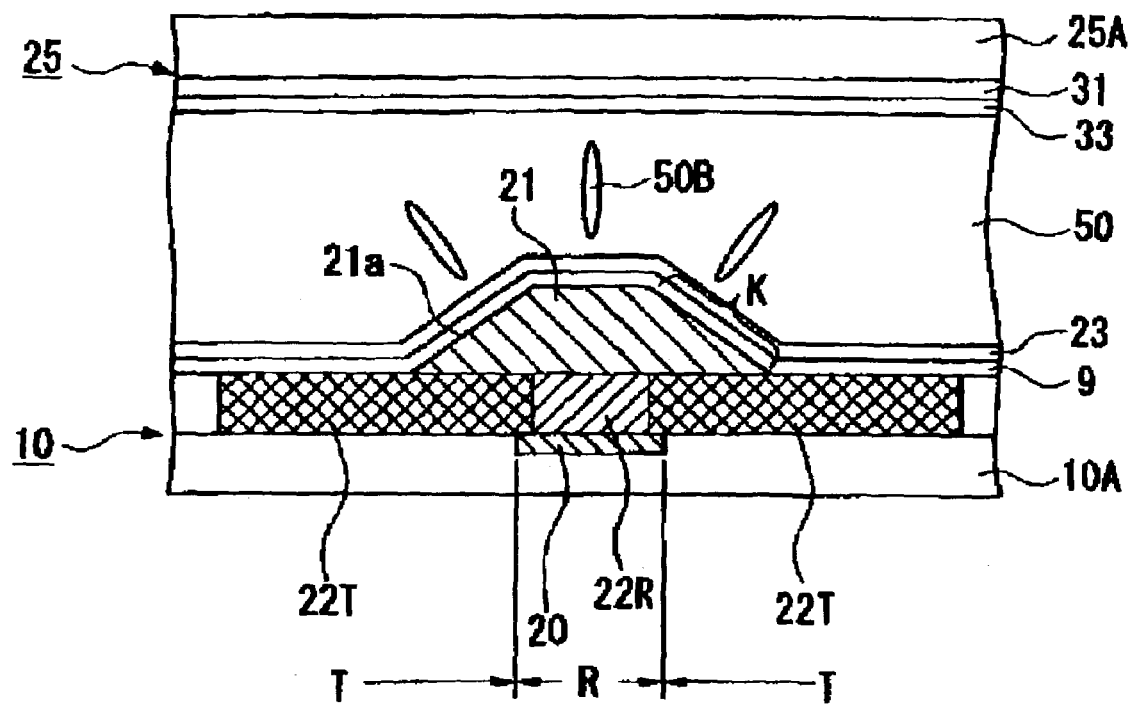
FIG. 3 is a sectional view taken along plane A-A' of FIG. 2, showing the structure of the liquid crystal display of the same.

Referring to FIGS. 1 to 3, a first exemplary embodiment of the present invention is described below.

A liquid crystal display of this exemplary embodiment is an example of an active-matrix liquid crystal display that uses a thin film transistor (hereinafter "TFT") as a switching element.

FIG. 1 is a schematic circuit diagram of a plurality of dots arranged in the form of matrix which constitute an image display area of the liquid crystal display according to this exemplary embodiment. FIG. 2 is a plan view showing the structure of the adjacent plurality of dots on a TFT array substrate. FIG. 3 is a sectional view taken along plane A-A' of FIG. 2, showing the structure of the liquid crystal display. In the following drawings, the layers and members are scaled variously in order to make them discernible on the drawings, and are not representative of their actual sizes.

In the liquid crystal display of this exemplary embodiment, each of the plurality of dots constituting an image display area and arranged in the form of matrix includes a pixel electrode 9 and a TFT 30 serving as a switching element to control the pixel electrode 9, and a data line 6a, to which an image signal is supplied, is electrically connected to the source of the TFT 30 as shown in FIG. 1. Image signals S1, S2, ..., Sn, which are written to the data line 6a, are line-sequentially supplied in this order or, alternatively, supplied to the adjacent plurality of data lines 6a by group. A scanning line 3a is electrically connected to the gate of the TFT 30, and scanning signals G1, G2, ..., Gm are line-sequentially applied to the plurality of scanning lines 3a at a fixed timing and in pulse. The pixel electrode 9 is electrically connected to the drain of each TFT 30, and write the image signals S1, S2, ..., Sn supplied over the data lines 6a at a fixed timing by turning on the TFT 30 serving as a switching element for only a fixed period of time.

The image signals S1, S2, ..., Sn, which were written to the liquid crystal through the pixel electrodes 9, are held between the pixel electrodes 9 and a common electrode, which are described below, for a fixed period of time. The liquid crystal modulates light by varying the orientation and order of the molecular association depending on the applied voltage level, thereby allowing gray scale to be assigned. A storage capacitor 70 is added in parallel with a liquid crystal capacitor formed between each pixel electrode 9 and the common electrode in order to prevent or reduce leakage of the held image signals. Reference numeral 3b denotes a capacitor line.

Next, referring to FIG. 2, the planar structure of the TFT array substrate that constitutes the liquid crystal device of this exemplary embodiment is described below.

As shown in FIG. 2, the plurality of rectangular pixel electrodes 9 (the outline is shown by the dotted line 9A) is arranged in the form of matrix on the TFT array substrate, and the data lines 6a, the scanning lines 3a, and the capacitor lines 3b are provided along the vertical and horizontal boundaries of the pixel electrodes 9. In this exemplary embodiment, the inside of the area having each pixel electrode 9 and the data line 6a, the scanning line 3a, and the capacitor line 3b disposed to surround each pixel electrode 9 forms one dot area, having a structure capable of displaying for each dot area disposed in matrix form.

The data line 6a is electrically connected to a later-described source area of a semiconductor layer 1a constituting the TFT 30 and formed of, for example, a polysilicon film, through a contact hole 5. Each pixel electrode 9 is electrically connected to a later-described drain area of the semiconductor layer 1a through a contact hole 8. The scanning line 3a is arranged so as to face a channel area (left-upward obliquely shaded area in the drawing) of the semiconductor layer 1a, the scanning line 3a functioning as a gate electrode at a portion facing the channel area.

The capacitor line 3b includes a main line section (a first area along the scanning line 3a in plan view) extending substantially linearly along the scanning line 3a, and a projecting section (a second area extending along the data line 6a in plan view) projecting from a portion intersecting the data line 6a toward the preceding stage (upward in the drawing) along the data line 6a. In FIG. 2, the area shown by a right-upward obliquely shaded area includes a plurality of first light shielding films 11a.

More specifically, the first light shielding films 11a are each arranged in the position to cover the TFTs 30 including the channel area of the semiconductor layer 1a, as viewed from the TFT array substrate side, and include a main line section extending linearly along the scanning line 3a and facing the main line section of the capacitor line 3b, and a projecting section projecting from a portion intersecting the data line 6a toward the adjacent post stage (downward in FIG. 2) along the data line 6a. The end of the downward projecting section in each stage (pixel row) of the first light shielding films 11a overlaps the end of the upward projecting section of the post-stage capacitor line 13b under the data line 6a. The overlapped portions each include a contact hole 13 that electrically connects the first light shielding film 11a and the capacitor line 3b to each other. In other words, in this exemplary embodiment, the first light shielding films 11a are electrically connected to the preceding- or post-stage capacitor line 3b through the contact holes 13.

As shown in FIG. 2, a rectangular reflective film 20 is formed in the center of one dot area, an area including the reflective film 20 serving as a reflective display area R and the peripheral area including no reflective film 20 serving as a transparent display area T. Also, a rectangular insulating film 21 is formed so as to include the area including the reflective film 20 therein in plan view.

Referring to FIG. 3, the sectional structure of the liquid crystal display of this exemplary embodiment is described below. FIG. 3 is a sectional view taken along plane A-A' of FIG. 2. However, the present invention provides in the structure of the insulating film in the center of the dot and the sectional structures of the TFT and other wirings are the same as those of the related art structure, so that the drawing and the description of the TFT and wirings are omitted.

As shown in FIG. 3, a liquid crystal layer 50 formed of a liquid crystal that is vertically aligned in the initial alignment state is sandwiched between a TFT array substrate 10 and an opposed substrate 25 opposed thereto. The TFT array substrate 10 includes the reflective film 20 formed of a high-reflective metallic film, such as aluminum and silver, on the surface of a substrate main body 10A made of a translucent material such as quartz and glass. As described above, the area including the reflective film 20 serves as the reflective display area R and the area including no reflective film 20 serves as the transparent display area T.

A dye layer 22R constituting a color filter for reflective display is formed on the reflective film 20 located in the reflective display area R. A dye layer 22T constituting a color filter for transparent display is formed on the substrate located in the transparent display area T. Generally, in the transflective liquid crystal display, light passes through a color filter two times in the reflective display, while in the transparent display, it passes only once, thus posing a problem of different display chroma between the reflective display and the transparent display. Accordingly, the applicant has proposed a technique of enhancing the balance of display color between the reflective display and the transparent display by changing the color purity of the dye layer of the color filter between in the reflective display area and in the transparent display area. The aforesaid dye layers of the reflective-display color filter and the transparent-display color filter employ the technique.

The respective dye layers 22R and 22T of the reflective-display color filter and the transparent-display color filter have an insulating film 21 in the position corresponding to the reflective display area R. The insulating film 21 is made of an organic film, such as an acrylic resin, having a film thickness of about 2 to 3 µm, having an inclined area K including an inclined plane 21a so as to vary the thickness of the insulating film 21 continuously in the vicinity of the boundary between the reflective display area R and the transparent display area T. Since the thickness of a liquid crystal layer 50 at the portion including no insulating film 21 is about 4 to 6 µm, the thickness of the liquid crystal layer 50 in the reflective display area R is about one-half of the thickness of the liquid crystal layer 50 in the transparent display area T. In other words, the insulating film 21 works as a liquid-crystal-layer-thickness control layer to make the thickness of the liquid crystal layer 50 different between in the reflective display area R and the transparent display area T owing to its film thickness. The angle θ formed by the surface of the dye layers 22R and 22T of the color filters and the inclined plane 21a of the insulating film 21 is about 5° to 50°. In this exemplary embodiment, the edge of the planar plane at the upper part of the insulating film 21 and the edge of the reflective film 20 (reflective display area) coincide substantially with each other, the inclined area K being included in the transparent display area T.

The surface of the TFT array substrate 10 that includes the surface of the insulating film 21 has the pixel electrodes 9 made of a transparent conductive film, such as indium tin oxide (hereinafter, abbreviated to ITO) and an alignment film 23 made of polyimide or the like.

On the other hand, the opposed substrate 25 has a common electrode 31 made of a transparent conductive film, such as an ITO, and an alignment film 33 made of polyimide or the like on a substrate main body 25A made of a translucent material, such as glass and quartz. The respective alignment films 23 and 33 of the TFT array substrate 10 and the opposed substrate 25 are both subjected to vertical alignment treatment.

The TFT array substrate 10 has a circularly polarizing plate on the outer surface thereof, and the opposed substrate 25 also has a circularly polarizing plate on the outer surface, which are not shown.

According to the liquid crystal display of this exemplary embodiment, since the reflective display area R includes the insulating film 21, the thickness of the liquid crystal layer 50 in the reflective display area R can be as small as about one-half of the thickness of the liquid crystal layer 50 in the transparent display area T. Therefore, the retardation in the reflective display area R and the retardation in the transparent display area T can be made to be substantially equal, thereby enhancing the contrast. Furthermore, since the insulating film 21 projects toward the liquid crystal layer 50, which serves as a projection, a pre-tilt that corresponds to the shape of the projection can be given with the liquid crystal molecules 50B vertically aligned in the initial state. Due to this action, when an electric field is applied to the liquid crystal molecules 50B, the alignment orientation of the liquid crystal molecules 50B can be controlled. Consequently, high-contrast display can be achieved without imperfect display, such as light drop.

That is, with the structure of this exemplary embodiment, the transflective liquid crystal display in a vertical alignment mode has the insulating film 21. Accordingly, the problem of reduction in contrast due to the difference of retardation between the reflective and the transparent display modes can be reduced or solved, and imperfect display because of the fact that the alignment orientation of the liquid crystal molecules in the vertical alignment mode cannot be controlled can be reduced. Consequently, both the advantage of the vertical alignment mode and the advantage of the transflective type can be fully taken to realize a liquid crystal display of high display quality.

In this exemplary embodiment, the rectangular reflective display area R is provided in the center of one dot area and the rectangular insulating film 21 is disposed at a portion corresponding to the reflective display area R in the center of the dot area. Therefore, the alignment orientations of the liquid crystal molecules are specified to four orientations that are perpendicular to each side of the rectangle with the insulating film 21 in the center of the dot as the center. As a result, four areas (domains) each having a different alignment orientation are formed in one dot area to realize an alignment dividing structure, thus achieving a wide viewing angle.

The insulating film 21 includes the inclined area K in the vicinity of the boundary between the reflective display area R and the transparent display area T, and the alignment of the liquid crystal molecules 50B varies continuously depending on the position of the inclined plane 21a of the insulating film 21. Accordingly, no large alignment turbulence occurs, thus preventing or reducing imperfect display. The inclined plane 21a of the insulating film 21 is also inclined in four directions perpendicularly intersecting each other. Thus, the presence of the inclined plane 21a allows smooth formation of the alignment dividing structure.

Figure 4:
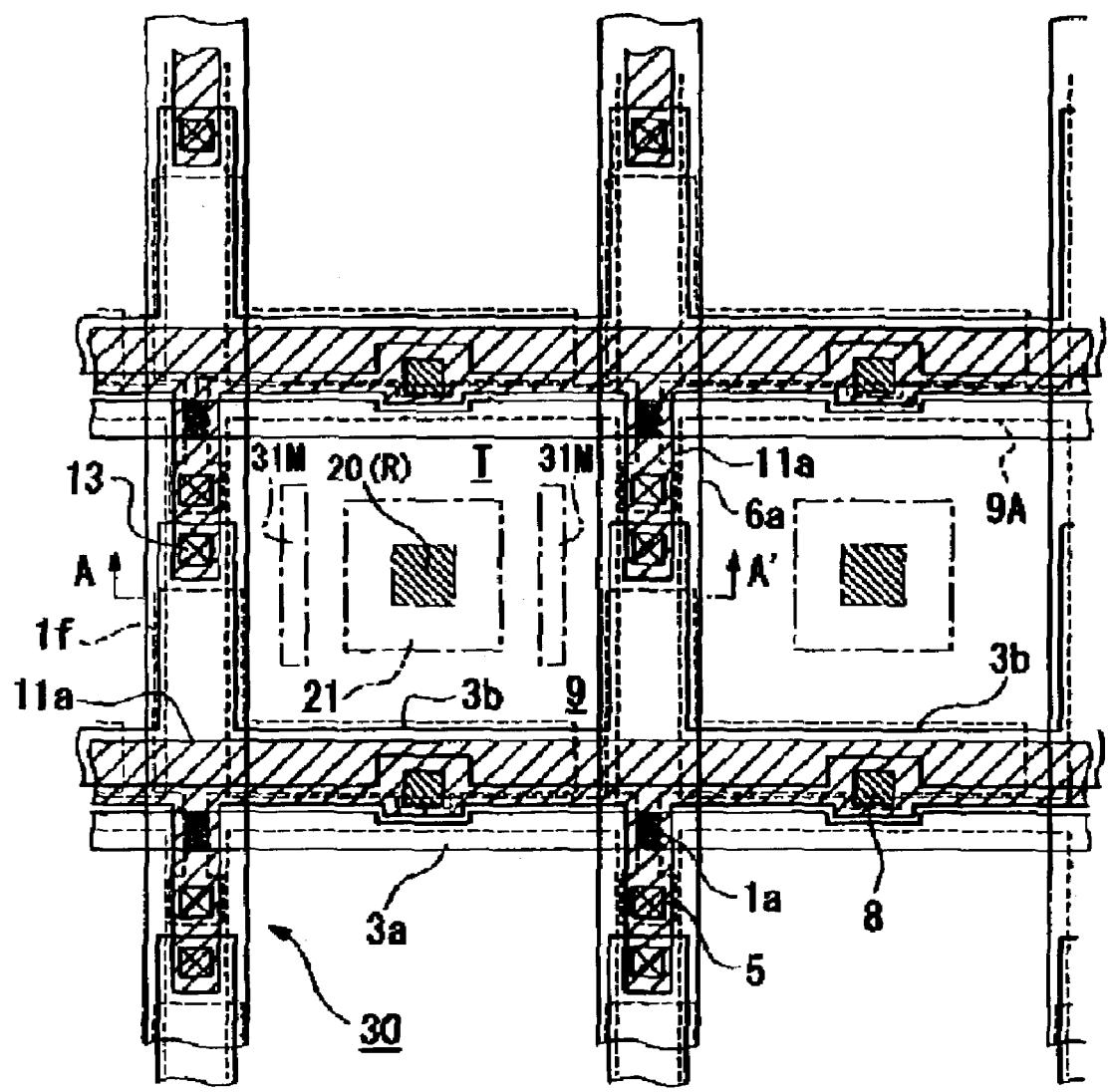
FIG. 4 is a plan view showing the structure of an adjacent plurality of dots on a TFT array substrate, which constitutes a liquid crystal display according to a second exemplary embodiment of the present invention.
Figure 5:
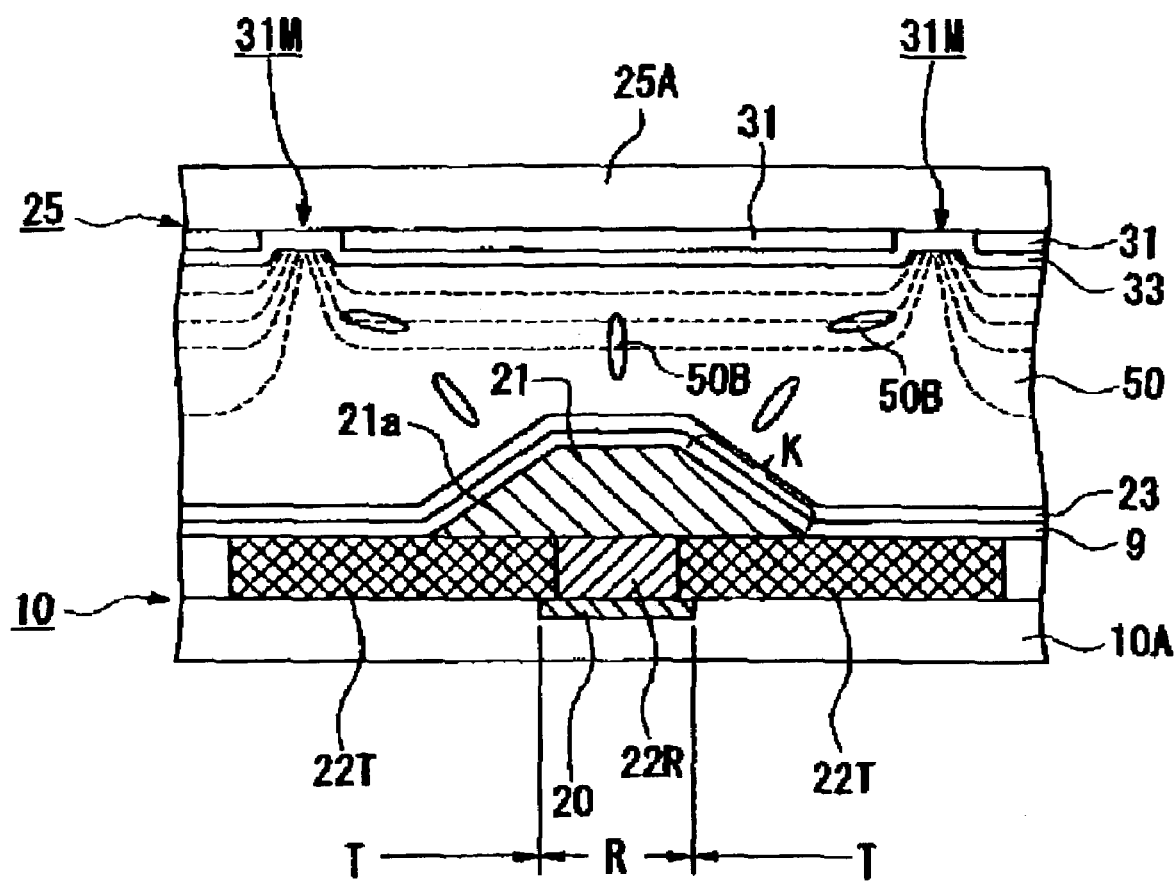
FIG. 5 is a sectional view taken along plane A-A' of FIG. 4, showing the structure of the liquid crystal display of the same.

Referring to FIGS. 4 and 5, a second exemplary embodiment of the present invention is described below.

The principle structure of a liquid crystal display of this exemplary embodiment is similar to that of the first exemplary embodiment, but is only different in that the common electrode has a window for alignment control. Therefore, in FIGS. 4 and 5, components that are common to those of FIGS. 2 and 3 are given the same reference numerals and a detailed description thereof is omitted.

In this exemplary embodiment, as shown in FIGS. 4 and 5, the structure of the TFT array substrate 10 is not different from that of the first exemplary embodiment. However, a common electrode 31 on the opposed substrate 25 has a window 31M. Two windows 31M are provided for one dot that is formed in a long rectangular shape along the data line 6a in plan view. The windows 31M are located on the outside of the inclined area K of the insulating film 21.

As described in the first exemplary embodiment, with the structure of the present invention, merely providing the insulating film that is a projection toward the liquid crystal layer allows control of alignment orientation. However, as in this exemplary embodiment, when the windows 31M are provided in the common electrode 31 on the opposed substrate 25 that faces the insulating film 21 and on the outside of the inclined area K of the insulating film 21, an electric field generating between the electrodes on both the substrates tilts because the windows 31M include no electrodes. The action of the inclined electric field allows smoother control of the alignment orientation of the liquid crystal molecules 50B. The broken lines shown in the liquid crystal layer 50 of FIG. 5 are potential lines. The liquid crystal molecules 50B are aligned along the potential lines, thus being aligned smoothly without generating disclination due to the insulating film 21.

The shape of the window is not limited to that shown in FIG. 4, and instead may be formed in a rectangular ring shape in accordance with the four-directional domains. However, in that case, the inside and the outside of the window must be electrically connected as one electrode; therefore, preferably, it is not a perfectly continuous rectangular ring and instead the inside and the outside of the window are connected at an arbitrary portion.

Figure 6:
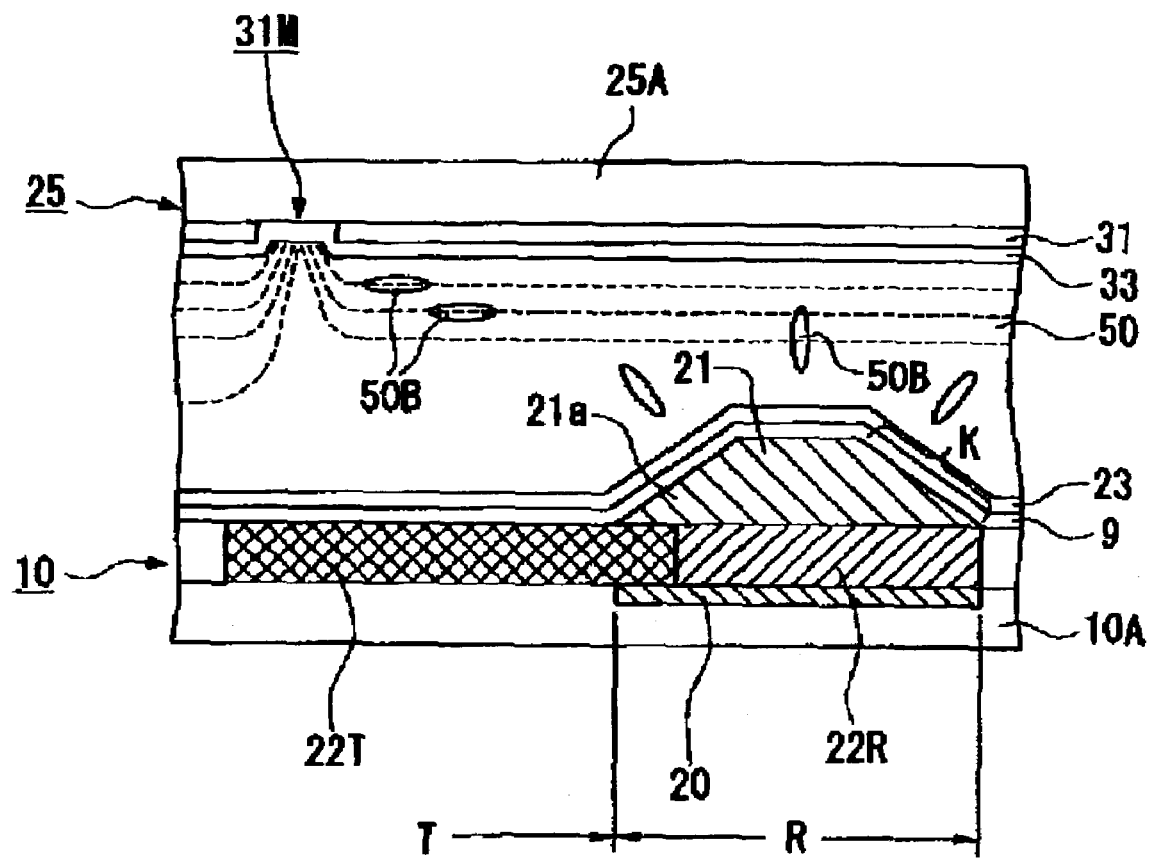
FIG. 6 is a sectional view showing the structure of a liquid crystal display according to a third exemplary embodiment of the present invention.

Referring to FIG. 6, a third exemplary embodiment of the present invention is described below.

The principle structure of a liquid crystal display of this exemplary embodiment is similar to that of the first and second exemplary embodiments, but is different in the position of the insulating film. Therefore, in FIG. 6, components that are common to FIGS. 3 and 5 are given the same reference numerals and a detailed description thereof is omitted.

In the first and second exemplary embodiments, the insulating film 21 is provided in the center of one dot. On the other hand, in this exemplary embodiment, the insulating film 21 is disposed near one end of one dot, as shown in FIG. 6. Corresponding to that, only one window 31M is provided for one dot, that is arranged on the outside of the inclined area K of the insulating film 21.

In this exemplary embodiment, since the insulating film 21 is not located in the center of the dot, the alignment of the liquid crystal molecules 50B is not controlled so as to form four domains substantially uniformly in one dot, as in the first and second exemplary embodiments. However, it produces the similar advantages to those of the first and second exemplary embodiments in that the problem of reduction in contrast due to the difference of retardation between the reflective and the transparent display modes can be reduced or solved, and imperfect display because of the fact that the alignment orientation of the liquid crystal molecules in the vertical alignment mode cannot be controlled can be reduced. Thus, a liquid crystal display of high display quality can be realized. Although also this exemplary embodiment has the window 31M as in the second exemplary embodiment, the broken lines shown in the liquid crystal layer 50 of FIG. 6 are potential lines, and the liquid crystal molecules 50B are aligned along the potential lines, thus being aligned smoothly without generating disclination due to the insulating film 21.

Figure 7:
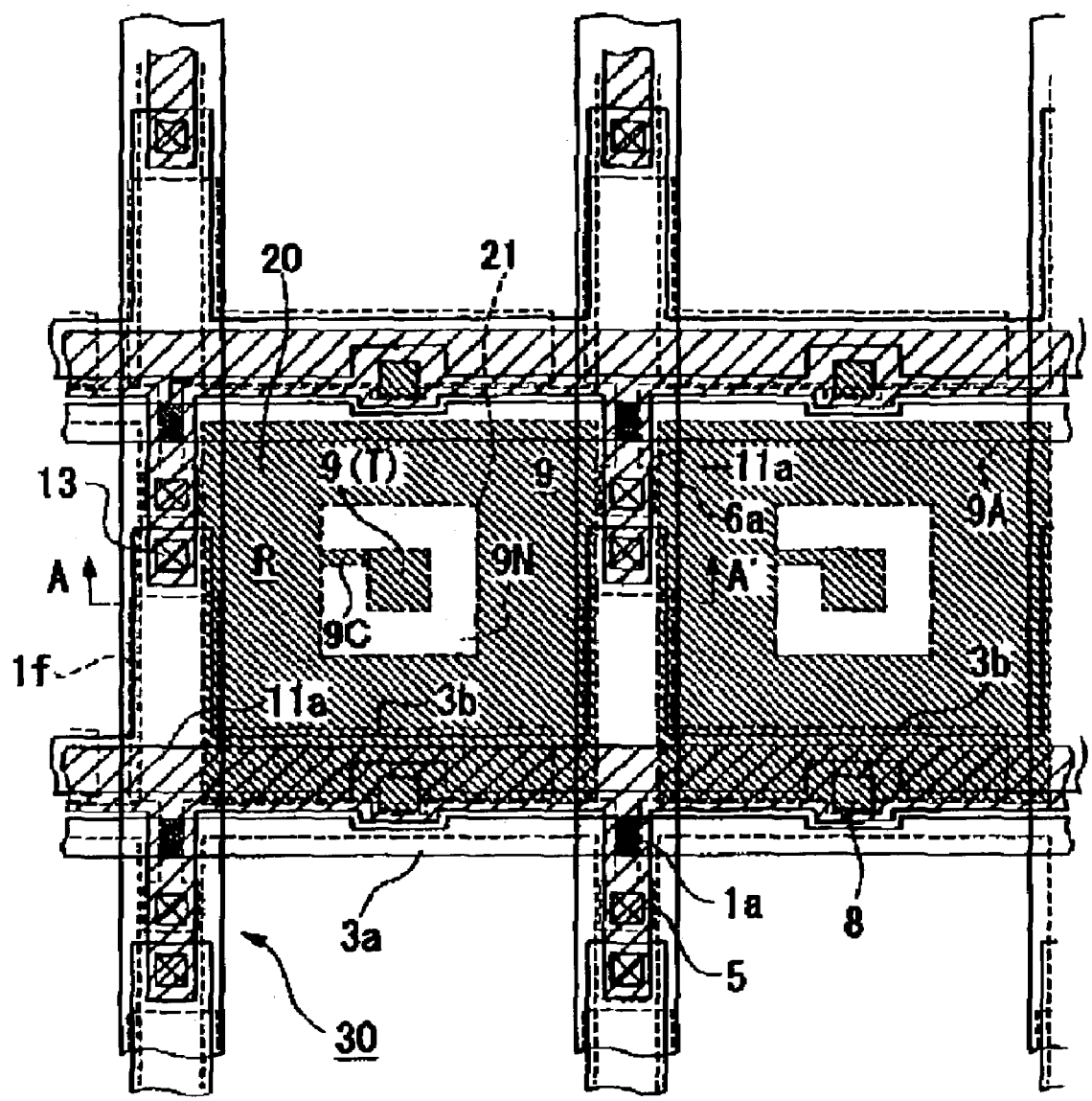
FIG. 7 is a plan view showing the structure of an adjacent plurality of dots on a TFT array substrate, which constitutes a liquid crystal display according to a fourth exemplary embodiment of the present invention.
Figure 8:
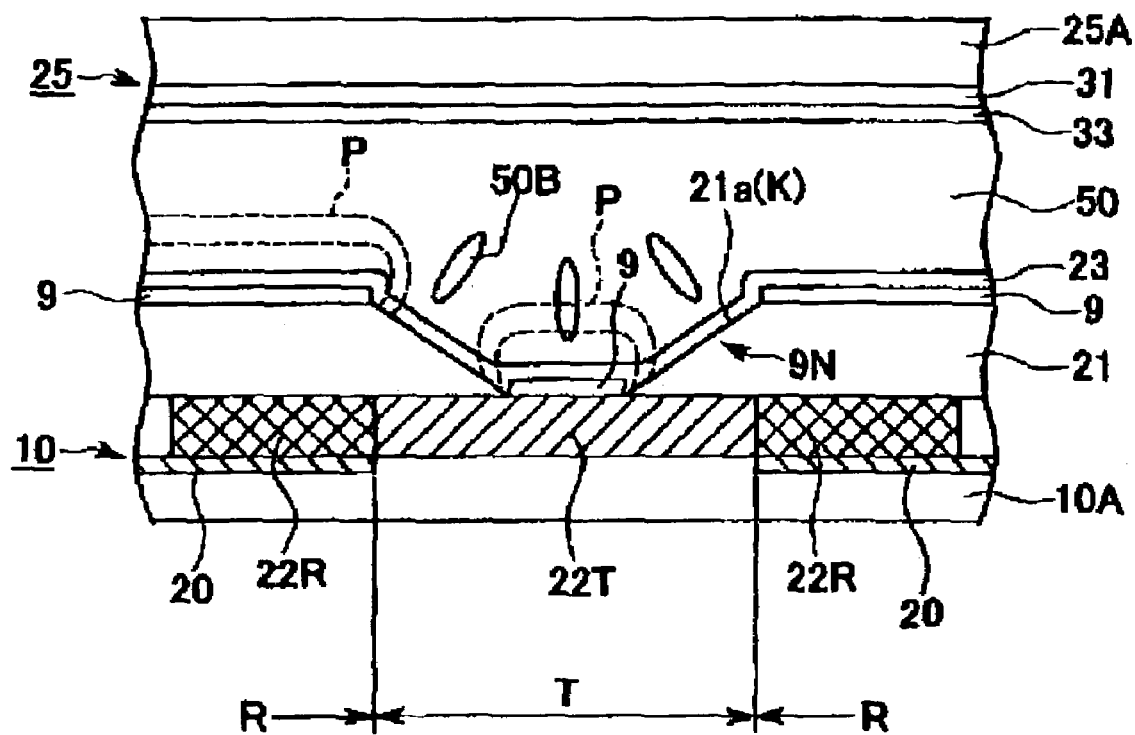
FIG. 8 is a sectional view taken along plane A-A' of FIG. 7, showing the structure of the liquid crystal display of the same.

Referring to FIGS. 7 and 8, a fourth exemplary embodiment of the present invention is described below.

FIG. 7 is a plan view showing the structure of an adjacent plurality of dots on a TFT array substrate. FIG. 8 is a sectional view taken along plane A-A' of FIG. 7, showing the structure of the liquid crystal display of the same.

The principle structure of a liquid crystal display of this exemplary embodiment is similar to that of the first to third exemplary embodiments, but the positional relationship between the reflective display area R and the transparent display area T is inversed, and the shape of the pixel electrode is different. In FIGS. 7 and 8, components that are common to FIGS. 2 and 3 are given the same reference numerals and a detailed description thereof is omitted.

The TFT array substrate of this exemplary embodiment has the reflective film 20 shaped like a rectangular frame in the periphery of one dot area, as shown in FIG. 7. An area including the reflective film 20 serves as the reflective display area R, and an area including no reflective film 20, which is inside the reflective display area R, serves as the transparent display area T. In other words, in the first to third exemplary embodiments, the inside of one dot area is the reflective display area R and the outside is the transparent display area T. On the other hand, in this exemplary embodiment, they are inversed. Also, the insulating film 21 shaped like a rectangular frame is formed so as to include the area of the reflective film 20 therein in plan view.

For the sectional structure, the reflective film 20 formed of a high-reflective metallic film, such as aluminum and silver; is formed on the TFT array substrate 10, as shown in FIG. 8. As described above, the area of the reflective film 20 serves as the reflective display area R and the area having no reflective film 20 serves as the transparent display area T. The dye layer 22R constituting a reflective-display color filter is provided on the reflective film 20 which is located in the reflective display area R. The dye layer 22T constituting a transparent-display color filter is provided on the substrate located in the transparent display area T. On the respective dye layers 22R and 22T of the reflective-display color filter and the transparent-display color filter, the insulating film 21 is formed in the position corresponding to the reflective display area R. The insulating film 21 has the inclined area K including the inclined plane 21a so as to vary its thickness continuously in the vicinity of the boundary between the reflective display area R and the transparent display area T. In this exemplary embodiment, the edge of the planar plane at the upper part of the insulating film 21 and the edge of the reflective film 20 (reflective display area) coincide substantially with each other, the inclined area K being included in the transparent display area T.

On the surface of the TFT array substrate 10 including the surface of the insulating film 21, the pixel electrodes 9 formed of a transparent conductive film, such as an ITO, are provided. However, in the first to third exemplary embodiments, the pixel electrodes 9 are formed over the entire one dot area. On the other hand, in this exemplary embodiment, the pixel electrodes 9 are formed on the planar plane of the insulating film 21, but are not formed on the inclined plane 21a, which becomes a no electrode formed area 9N.

This construction is shown as a plan view in FIG. 7, where the area including the pixel electrodes 9 is indicated by a right-downward obliquely shaded area. More specifically, the insulating film 21 includes a recessed area shaped like an inverse quadrangular pyramid in the center of the dot area, on the inclined plane 21a of which has no pixel electrodes 9, thus forming the no electrode formed area 9N shaped like a substantially rectangular frame. However, when the no electrode formed area 9N is shaped like a rectangular frame, the electrodes on the outside (reflective display area R) and the electrodes on the inside (transparent display area T) are completely separated. Therefore, the pixel electrodes 9 in the reflective display area R and the pixel electrodes 9 in the transparent display area T are electrically connected through a connecting section 9C formed of an ITO which has the same layer as the electrodes. With such a structure, the same driving voltage can simultaneously be applied to the pixel electrodes 9 in both the reflective display area R and the transparent display area T. The connecting section 9C may be formed of a different layer from the pixel electrodes 9 and may be connected to the pixel electrodes 9 through a contact hole. Also, as shown in FIG. 8, the alignment film 23 made of polyimide or the like is formed on the entire substrate so as to cover the pixel electrodes 9 and the inclined plane 21a of the insulating film 21.

On the other hand, the opposed substrate 25 has the common electrode 31 made of a transparent conductive film, such as an ITO, and the alignment film 33 made of polyimide or the like on the substrate main body 25A made of a translucent material, such as glass and quartz. The respective alignment films 23 and 33 of the TFT array substrate 10 and the opposed substrate 25 are both subjected to vertical alignment treatment.

This exemplary embodiment can also produce the similar advantages to the first to third exemplary embodiments. More specifically, as described in the above exemplary embodiments, with the structure of the present invention, merely providing the insulating film 21 serving as a projection that projects toward the liquid crystal layer allows control of alignment orientation. However, in this exemplary embodiment, there are no pixel electrodes 9 on the inclined plane 21a of the insulating film 21. Therefore, an electric field generating between the electrodes on both the substrates is distorted in the vicinity of the inclined area K. The distortion of the electric field allows much smoother control of the alignment orientation of the liquid crystal molecules 50B. The broken lines P shown in the liquid crystal layer 50 of FIG. 8 are potential lines. The liquid crystal molecules 50B are aligned along the potential lines p, thus being aligned smoothly without generating disclination due to the insulating film 21.

Figure 9:
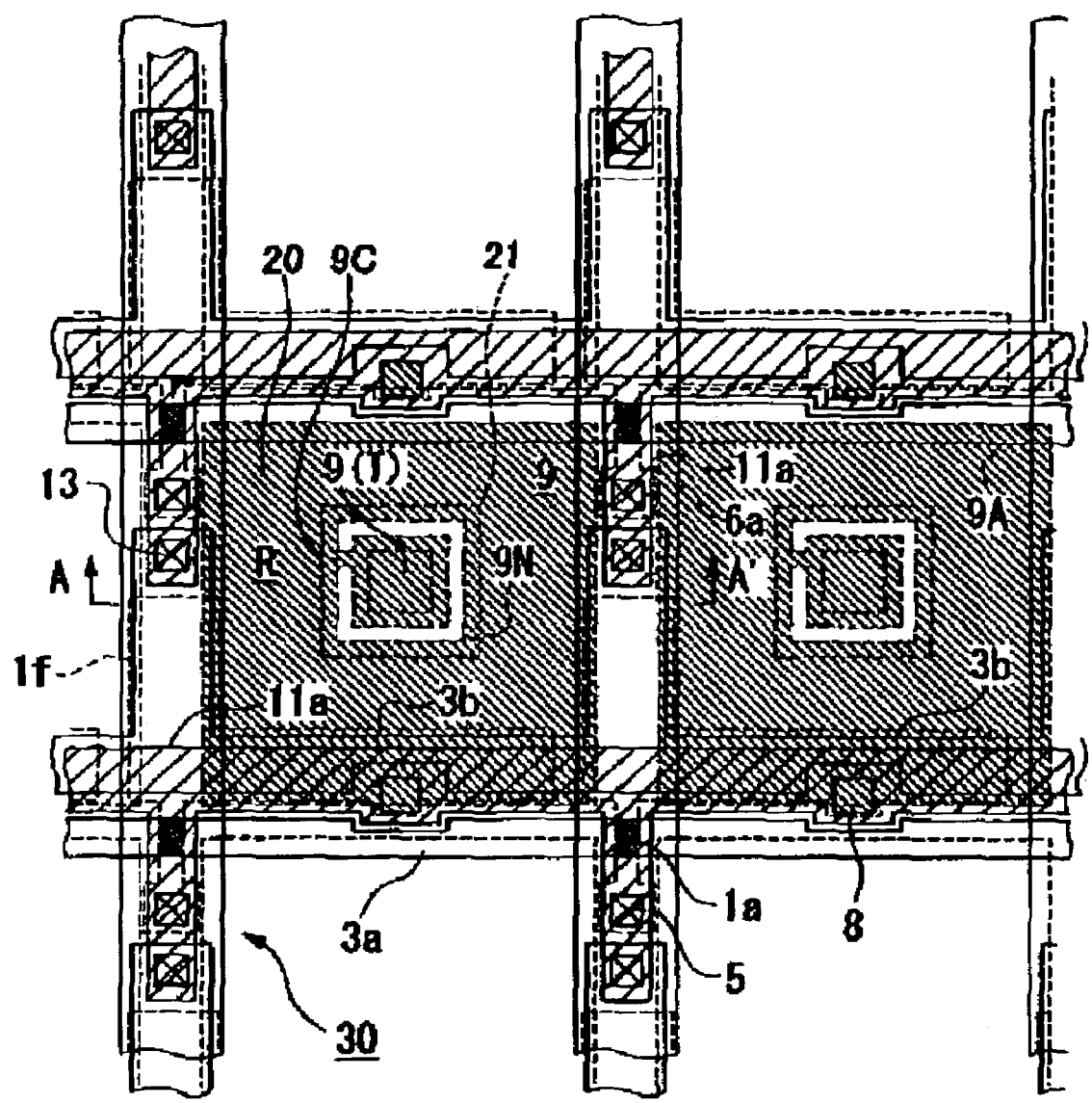
FIG. 9 is a plan view showing the structure of an adjacent plurality of dots on a TFT array substrate, which constitutes a liquid crystal display according to a fifth exemplary embodiment of the present invention.
Figure 10:
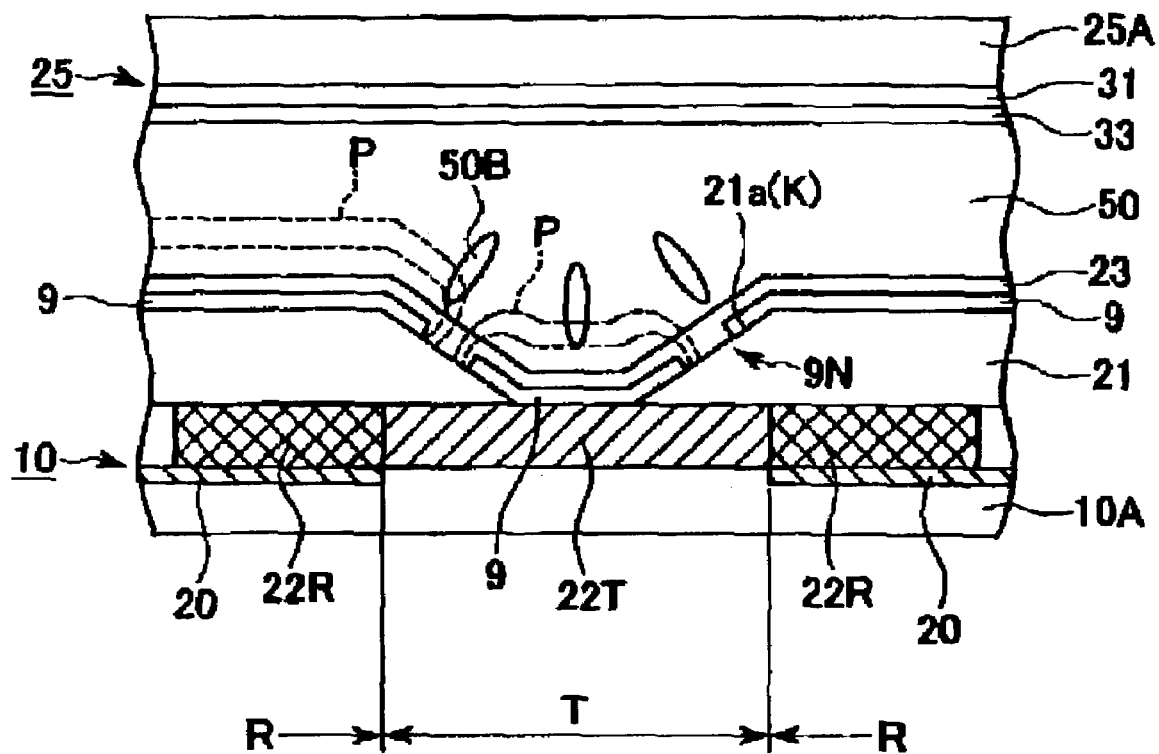
FIG. 10 is a sectional view taken along plane A-A' of FIG. 9, showing the structure of the liquid crystal display of the same.

Referring to FIGS. 9 and 10, a fifth exemplary embodiment of the present invention is described below.

The principle structure of a liquid crystal display of this exemplary embodiment is similar to that of the fourth exemplary embodiment, but is different in the size of the no electrode formed area. Therefore, in FIGS. 9 and 10, components that are common to FIGS. 7 and 8 are given the same reference numerals and a detailed description thereof is omitted.

In the fourth exemplary embodiment, the entire inclined plane 21a of the insulating film 21 is no electrode formed area 9N. On the other hand, in this exemplary embodiment, only part of the inclined plane 21a of the insulating film 21 is the no electrode formed area 9N shaped like a slit as shown in FIGS. 9 and 10. In both the fourth and fifth exemplary embodiments, in order to form the no electrode formed area 9N, it is enough to merely make the mask pattern into this shape in patterning the pixel electrodes 9. Therefore, they are not particularly different in production process from the case without the no electrode formed area 9N.

Also this exemplary embodiment includes the no electrode formed area 9N having no pixel electrodes 9 on the inclined plane 21a of the insulating film 21, thus offering the advantages similar to those of the fourth embodiment, that is, the electric field generating between the electrodes on both the substrates is distorted in this area, which allows much smoother control of alignment orientation of the liquid crystal molecules 50B. The shape, the position and so on of the no electrode formed area 9N in the fourth and fifth exemplary embodiments are not particularly limited to the above example, but may be modified as appropriate.

Figure 11:
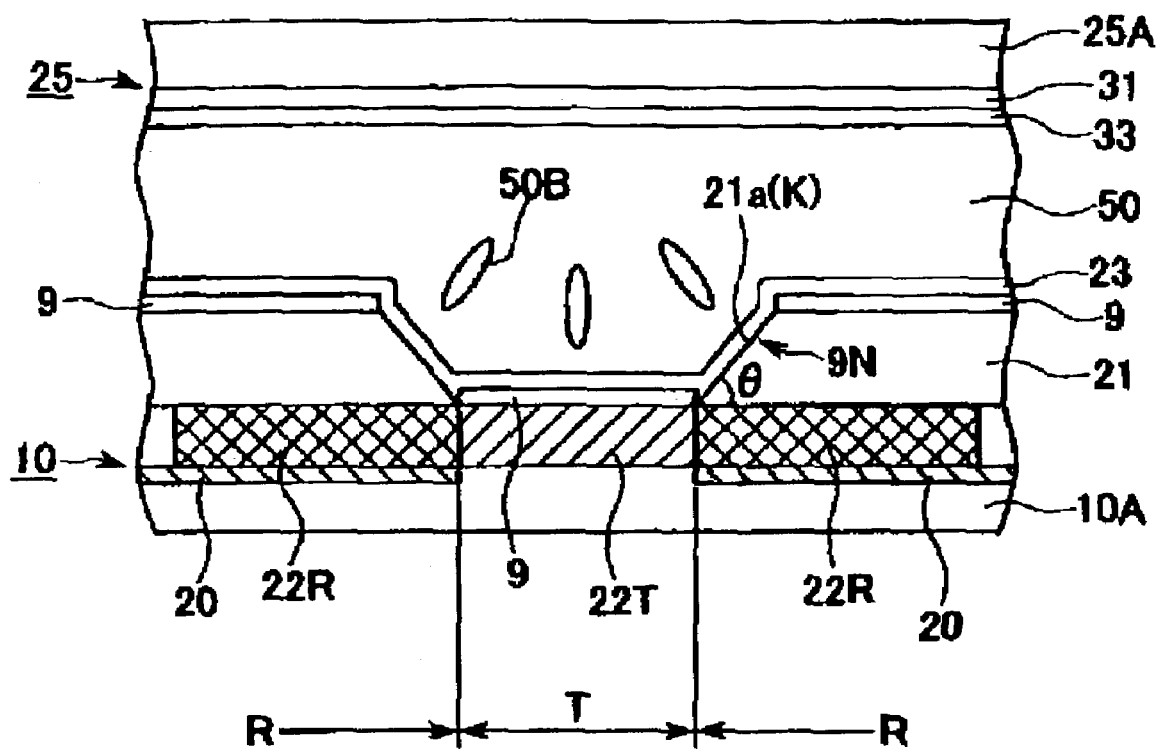
FIG. 11 is a sectional view showing the structure of a liquid crystal display according to a sixth exemplary embodiment of the present invention.

Referring to FIG. 11, a sixth exemplary embodiment of the present invention is described below.

The principle structure of a liquid crystal display of this exemplary embodiment is similar to that of the fourth exemplary embodiment, but the inclination angle of the inclined plane of the insulating film is specified. Therefore, in FIG. 11, components that are common to FIG. 8 are given the same reference numerals and a detailed description thereof is omitted.

When the area of the transparent display area T is relatively large in one dot area (for example, the proportion of the area of the transparent display area T is 50% or more), the reflective film 20 is extended downward from the inclined area K of the insulating film 21, and the inclined area K of the insulating film 21 is used as the reflective display area R, as shown in FIG. 11. The fourth exemplary embodiment (FIG. 8) has no reflective film 20 under the inclined area K of the insulating film 21, and the inclined area K of the insulating film 21 is the transparent display area T. The inclination angle θ of the inclined plane 21a of the insulating film 21 is specified to about 50°.

The inclined area K, whether in the transparent display area T or the reflective display area R, is a cause of decreasing the display quality because the retardation is a fractional value. In this exemplary embodiment, since this area is included in the reflective display area R, the transparent display does not decrease in quality while the reflective display is slightly inferior in quality. Accordingly, this has a structure somewhat suitable for a transflective liquid crystal display that attaches importance to transparent display.

Figure 12:
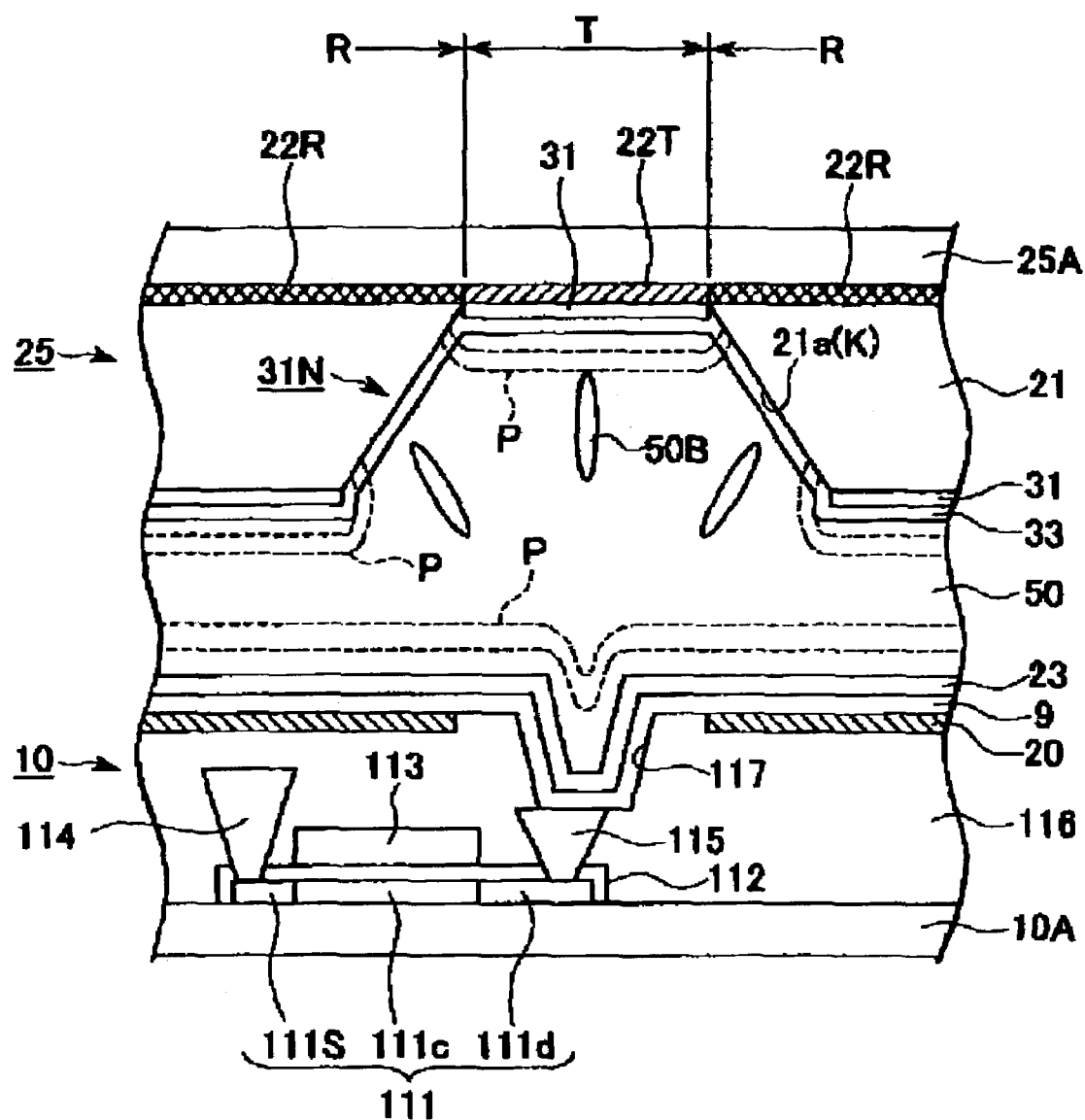
FIG. 12 is a sectional view showing the structure of a liquid crystal display according to a seventh exemplary embodiment of the present invention.
Figure 13:
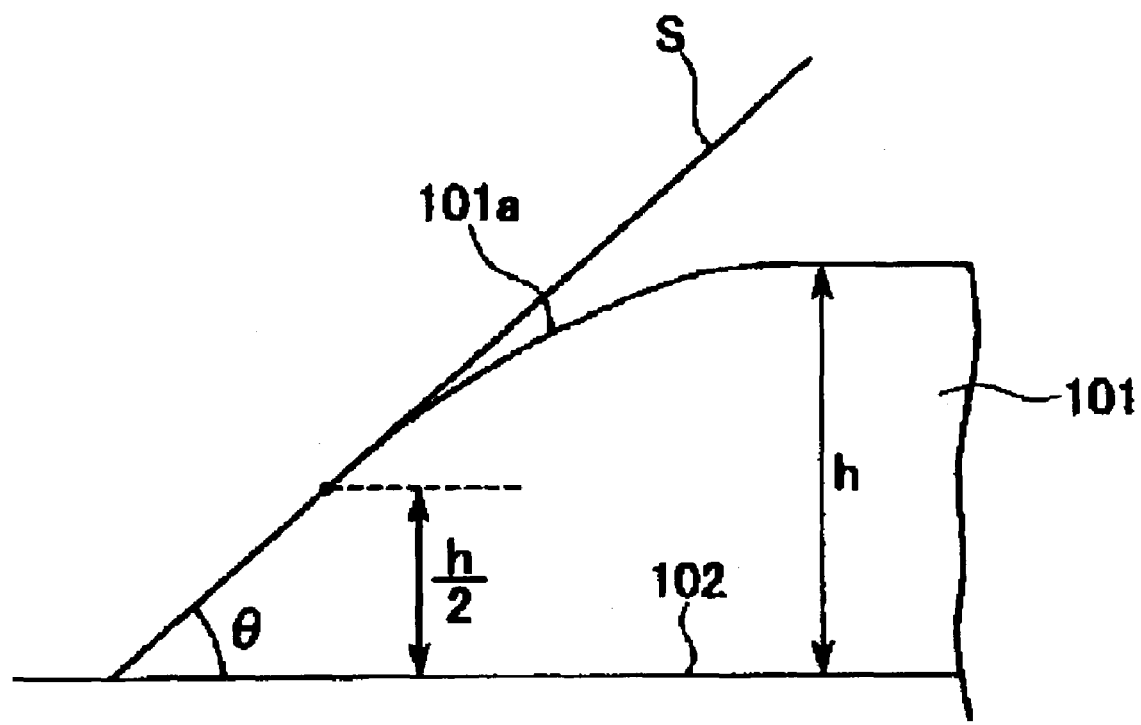
FIG. 13 is a graph explaining the inclination angle of an insulating film of the present invention.

Referring to FIG. 12, a seventh exemplary embodiment of the present invention is described below.

FIG. 12 is a sectional view showing the structure of a liquid crystal display of this exemplary embodiment. In FIG. 12, components that are common to the sectional views of the above exemplary embodiments of FIG. 8 and so on are given the same reference numerals and a detailed description thereof is omitted.

In the liquid crystal display of this exemplary embodiment, the liquid crystal layer 50 made of a liquid crystal, which is aligned vertically in the initial state, is sandwiched between the TFT array substrate 10 and the opposed substrate 25 opposed thereto, as shown in FIG. 12. The opposed substrate 25 has the dye layer 22R constituting a reflective-display color filter and the dye layer 22T constituting a transparent-display color filter thereon. The respective dye layers 22R and 22T of the reflective-display color filter and the transparent-display color filter have the insulating film 21 in the position corresponding to the reflective display area R. The common electrode 31 is formed on the insulating film 21 and the dye layer 22T of the transparent-display color filter. Also in this exemplary embodiment, the insulating film 21 includes the inclined plane 21a. However, the inclined plane 21a has no common electrode 31 thereon, serving as a no electrode formed area 31N.

The TFT array substrate 10 has a TFT 110 thereon. The TFT 110 has a semiconductor layer 111 including a source area 111s, a drain area 111d, and a channel area 111c, a gate insulating film 112, and a gate electrode 113. The source area 111s has a source line 114 (data line) connected thereto. The drain area 111d has a drain electrode 115 connected thereto. To the drain electrode 115, the pixel electrodes 9 are connected via a contact hole 117 of an interlayer insulating film 116. In this exemplary embodiment, the contact hole 117 does not overlap the inclined area K of the insulating film 21 of the opposed substrate 25 in plan view, but is arranged in the position below the dye layer 22T (planar plane) of the transparent-display color filter.

In this exemplary embodiment, the alignment of the liquid crystal molecules 50B can be controlled by the shape effect of the insulating film 21 formed on the opposed substrate 25, and further controlled by providing the no electrode formed area 31N having no common electrode 31 on the inclined plane 21a of the insulating film 21. In addition, the contact hole 117 is disposed on the TFT array substrate 10 in the area which corresponds to a planar plane and does not overlap the inclined area K of the insulating film 21 in plan view. Therefore, an electric field generating in the liquid crystal layer 50 is distorted in the vicinity of the contact hole 117. The distortion of the electric field allows much smoother control of the alignment orientation of the liquid crystal molecules 50B. The broken lines P shown in the liquid crystal layer 50 of FIG. 12 are potential lines. The liquid crystal molecules 50B are aligned along the potential lines p, thus being aligned smoothly without generating disclination.

[Electronic Device]

Subsequently, a specific example of an electronic device having the liquid crystal display according to the above exemplary embodiments of the present invention is described below.

Figure 14:
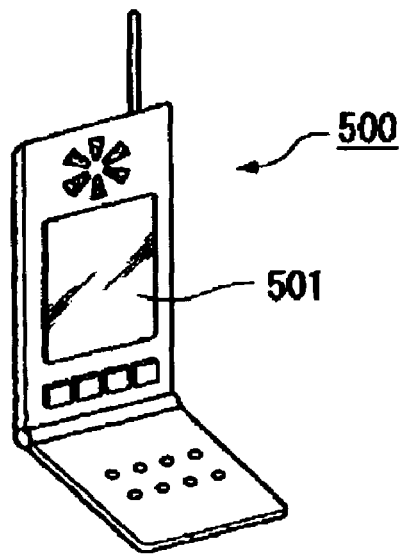
FIG. 14 is a perspective view showing an example of an electronic device of the present invention.

FIG. 14 is a perspective view showing an example of a cellular phone. In FIG. 14, reference numeral 500 denotes a cellular phone body; and reference numeral 501 indicates a display section using the above-described liquid crystal display.

Figure 15:
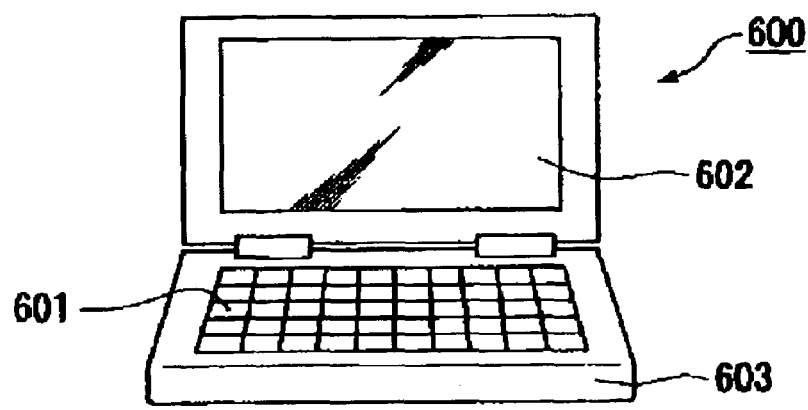
FIG. 15 is a perspective view showing another example of an electronic device of the present invention.

FIG. 15 is a perspective view showing an example of a portable information processing unit, such as a word processor and a personal computer, for example. In FIG. 15, reference numeral 600 denotes an information processing unit, numeral 601 denotes an input section such as a keyboard, numeral 603 indicates an information processing unit body, and numeral 602 indicates a display section using the above-described liquid crystal display.

Figure 16:
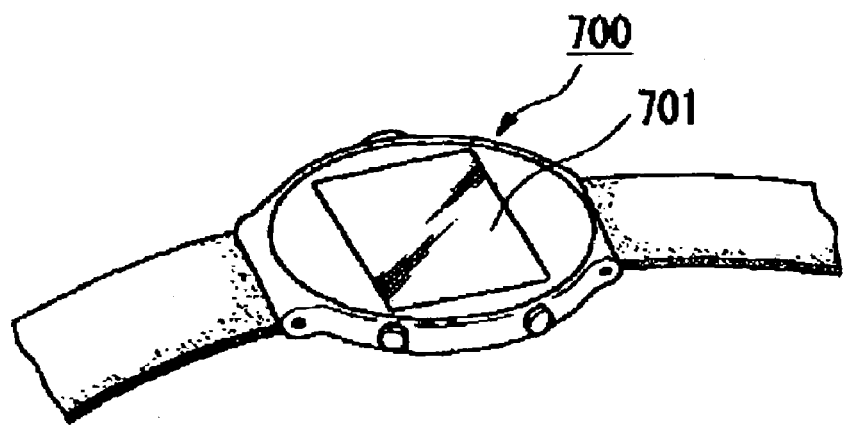
FIG. 16 is a perspective view showing still another example of an electronic device of the present invention.

FIG. 16 is a perspective view showing an example of a wristwatch type electronic device. In FIG. 16, reference numeral 700 denotes a watch body, and numeral 701 indicates a display section using the above-described liquid crystal display.

The electronic devices shown in FIGS. 14 to 16 each have a display section that uses the liquid crystal display of the above embodiments. Accordingly, electronic devices can be realized which have a light and high-contrast liquid crystal display having a wide viewing angle irrespective of use environment.

The technical scope of the present invention is not limited to the above exemplary embodiments, and various modifications are possible without departing from the scope of the invention. For example, while in the above exemplary embodiments, the present invention is applied to an active-matrix liquid crystal display using a TFT as a switching element, it is also possible to apply the present invention to an active-matrix liquid crystal display, a passive-matrix liquid crystal display and so on that use a thin-film-diode (TFD) switching element. Specific description about the materials, sizes, shapes of various components and so on may be changed as appropriate.

[Advantages]

As specifically described above, according to the present invention, in the transflective liquid crystal display, the problem of reduction in contrast due to the difference of retardation between the reflective and the transparent display modes can be addressed or solved, and imperfect display because of the fact that the alignment orientation of the liquid crystal molecules in the vertical alignment mode cannot be controlled can be reduced. Consequently, a liquid crystal display of high display quality can be realized. Also, an alignment dividing structure can be realized depending on the arrangement of the insulating film to achieve a wide viewing angle.

What is claimed is:

1. A liquid crystal display device, comprising:
   a first substrate having a first electrode;
   a second substrate having second electrodes;
   a plurality of dot areas formed at an overlapping portion of the first electrode and the second electrodes, one dot area including a transparent display area for a transparent display and a separate reflective display area for a reflective display;
   a liquid crystal layer sandwiched between the first and second substrates, the liquid crystal layer exhibiting vertical alignment in an initial alignment state; and
   an insulating film to adjust a thickness of the liquid crystal layer, provided in at least the reflective display area between the liquid crystal layer and one of the first and second substrates at a position, a thickness of the liquid crystal layer in a center of the one dot area being set smaller than a thickness of the liquid crystal layer in a periphery of the one dot area, the insulating film having an inclined area with continuously varying thickness and including an inclined plane,
   wherein the inclined plane of the insulating film inclines toward the transparent display area and is arranged at two opposite side ends of the reflective display area, the inclined plane controlling the alignment orientation of the liquid crystal layer, the transparent display area in the one dot area being adjacent to the transparent display area in an adjacent dot area.

2. The liquid crystal display device according to claim 1, the transparent display area being disposed to surround a periphery of the reflective display area in the one dot area, and the insulating film being disposed in an area corresponding to the reflective display area in the center of the one dot area the thickness of the liquid crystal layer in the center of the one dot area being set smaller than in the periphery of the one dot area.

3. The liquid crystal display device according to claim 1, the insulating film being selectively disposed in an area corresponding to the reflective display area in the periphery of the one dot area.

4. The liquid crystal display device according to claim 1 an electrode to drive the liquid crystal layer being provided to the substrate having the insulating film, and a no electrode formed area where the electrode is absent being provided in at least part of the inclined plane of the insulating film.

5. The liquid crystal display device according to claim 4, the electrode in the reflective display area and the electrode in the transparent display area, which are provided on both sides of the no electrode formed area, being electrically connected through a connecting section formed of the same layer as the electrodes.

6. The liquid crystal display device according to claim 4, the electrode in the reflective display area and the electrode in the transparent display area, which are provided on both sides of the no electrode formed area, being electrically connected through a connecting section formed of a different layer from the electrodes.

7. The liquid crystal display device according to claim 4, at least one of the first and second substrates being an element substrate having a pixel electrode and a switching element, and the other of the first and second substrates being an opposed substrate having a common electrode and the insulating film, a contact hole to electrically connect the pixel electrode and the switching element on the one substrate being disposed in the position not overlapping the inclined area.

8. The liquid crystal display device according to claim 4, an electrode to drive the liquid crystal layer and the insulating film being provided on one of the first and second substrates, and an electrode to drive the liquid crystal layer being provided on the other substrate, the electrode on the other of the first and second substrates including a window on the outside of the inclined area of the insulating film.

9. The liquid crystal display device according to claim 1, further including a circularly-polarized-light radiating device to radiate circularly polarized light into the first substrate and the second substrate.

10. An electronic device, comprising:
the liquid crystal display device according to claim 1.

11. The liquid crystal display device according to claim 1, further comprising:
a color filter having a first dye layer for the transparent display and a second dye layer for the reflective display, the color filter provided between at least one of the first and second substrates and the insulating film, the first dye layer located in the transparent display area, the second dye layer located in the reflective display area, and a color purity of the first dye layer being different from a color purity of the second dye layer.

12. The liquid crystal display device according to claim 1, the plurality of structures provided at the transparent display area arranged at the two opposite sides of the reflective display area in the one dot area.

13. The liquid crystal display device according to claim 12, the plurality of structures being windows of the electrode provided at the other one of the first and second substrates.

14. The liquid crystal display device according to claim 1, the inclined plane being substantially 5°-50° with respect to a surface of at least one of the first and second substrates.

15. A liquid crystal display device, comprising:
a first substrate having a first electrode;
a second substrate having second electrodes;
a plurality of dot areas formed at an overlapping portion of the first electrode and the second electrodes, one dot area including a transparent display area for a transparent display and a reflective display area for a reflective display surrounded with the transparent display area in the one dot area;
a liquid crystal layer sandwiched between the first and second substrates, the liquid crystal layer exhibiting vertical alignment in an initial alignment state; and
an insulating film to adjust a thickness of the liquid crystal layer, provided in at least the reflective display area between the liquid crystal layer and one of the first and second substrates at a position, such that the liquid crystal layer is thinner in the reflective display area than in the transparent display area, the insulating film having an inclined area in the vicinity of the boundary between the reflective display area and the transparent display area, the inclined area having an inclined plane so that a thickness of the insulating film continuously varies.

16. The liquid crystal display device according to claim 15, the thickness of the liquid crystal layer in a periphery of the one dot area being set smaller than in a center in the one dot area.

17. The liquid crystal display device according to claim 15, an outline of the insulating film in the one dot area being at least one of an equilateral polygon and a circle.

18. The liquid crystal display device according to claim 15, further comprising:
a color filter having a first dye layer for the transparent display and a second dye layer for the reflective display, the color filter provided between at least one of the first and second substrates and the insulating film, the first dye layer located in the transparent display area, the second dye layer located in the reflective display area, and a color purity of the first dye layer being different from a color purity of the second dye layer.

19. The liquid crystal display device according to claim 15, wherein the liquid crystal layer exhibits vertical alignment in an initial state.

20. The liquid crystal display device according to claim 15, the insulating film being selectively disposed in an area corresponding to the reflective display area in the periphery of the one dot area.

21. The liquid crystal display device according to claim 15, the inclined plane being substantially 5°-50° with respect to a surface of at least one of the first and second substrates.

* * * * *